2 Sheets—Sheet 1.

O. F. STEDMAN.
ATTACHMENTS FOR OIL OR GAS COOK-STOVES.

No. 192,629. Patented July 3, 1877.

WITNESSES

INVENTOR

2 Sheets—Sheet 2.
O. F. STEDMAN.
ATTACHMENTS FOR OIL OR GAS COOK-STOVES.
No. 192,629. Patented July 3, 1877.
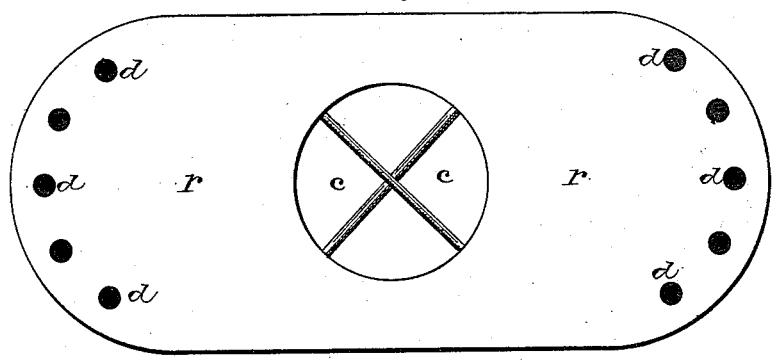
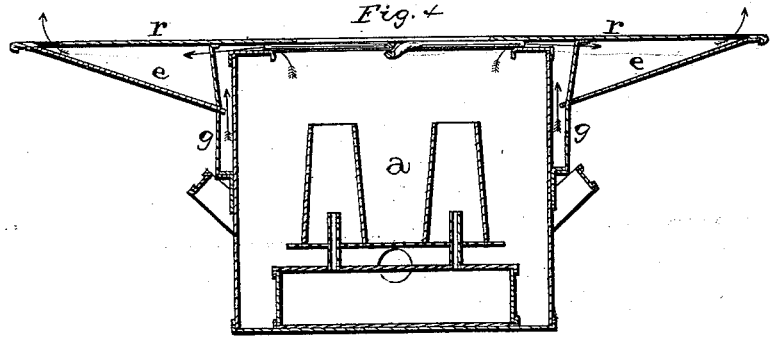
WITNESSES
INVENTOR
O. F. Stedman,
per
F. A. Lehmann,
Atty

UNITED STATES PATENT OFFICE.

OSCAR F. STEDMAN, OF WESTFIELD, NEW YORK.

IMPROVEMENT IN ATTACHMENTS FOR OIL OR GAS COOK-STOVES.

Specification forming part of Letters Patent No. 192,629, dated July 3, 1877; application filed June 23, 1877.

*To all whom it may concern:*

Be it known that I, O. F. STEDMAN, of Westfield, in the county of Chautauqua and State of New York, have invented certain new and useful Improvements in Attachments for Oil or Gas Cook-Stoves; and I do hereby declare the following to be a full, clear, and exact description of the invention, such as will enable others skilled in the art to which it pertains to make and use it, reference being had to the accompanying drawings, which form part of this specification.

My invention relates to an improvement in attachments to oil and gas cooking-stoves; and it consists in an attachment to the stove, which attachment is made hollow for the purpose of heating plates, dishes, and keeping warm messes that have been cooked, and is attached or secured in any suitable manner to the side or top of the stove, as will be more fully described hereinafter.

Figure 1:
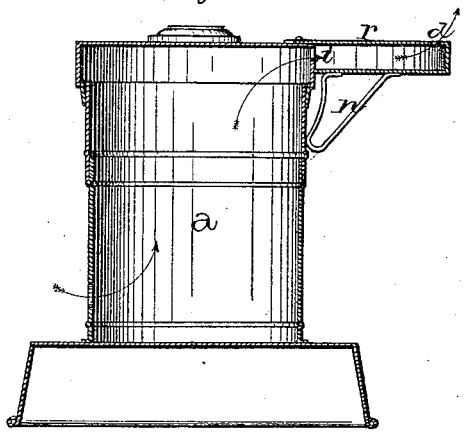
Figure 2:
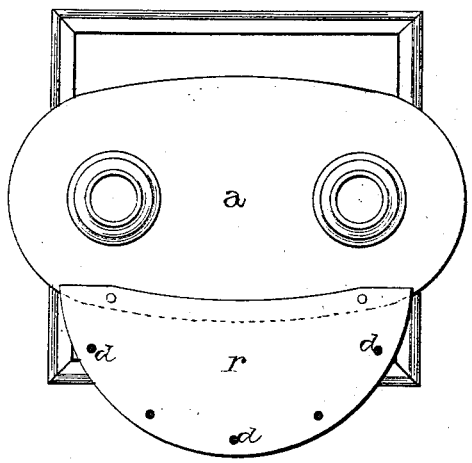

Figure 1 is a vertical section of one form of my invention. Fig. 2 is a plan view of the same. Fig. 4 is a longitudinal vertical section of another form of my attachment. Fig. 3 is a plan view of the same.

$a$ represents an oil or gas cooking-stove of any desired shape, form, or construction that may be preferred. In Fig. 4 is shown one form of stove now in use, and upon the top of which are formed alternate projections and depressions for the purpose of creating draft-flues when the vessel containing the substance to be heated or cooked is placed thereon. Upon the top of this stove is placed my heating attachment, which consists of the top plate $r$ of any desired size or material extending beyond the stove upon two or more sides, as shown. Through the center of this plate is made the large opening $c$, through which the heat of the lamp passes to the vessel placed over it, and in each end are a series of small holes, $d$, which act in connection with the draft-holes of the stove, so as to form draft-holes, and thereby cause the surplus heat to flow freely through them. To the under side of this plate, outside of the stove, is secured a jacket, $e$, of any suitable construction, so as to form a chamber through which the heated air escaping from the stove-flues passes on to the small holes $d$, thus heating this attachment throughout its whole extent. The inner ends of these jackets approach very near to the sides of the stove, leaving just sufficient space between them for sufficient cold air to pass up around the sides of the stove near the top, so as to prevent the sides of the stove from becoming too much heated.

In order to prevent my attachment from becoming accidentally displaced, hooks, clasps, or any suitable fastening devices $g$ are used that will answer the purpose of making it secure and at the same time easily detachable.

In Fig. 1 is shown another form of stove to which my attachment is also applied. In this instance suitable flues or draft-holes $i$ are made through the side of the stove near the top, upon one or more sides, for the surplus heat to pass directly into and through my attachment. Although this attachment is here shown as secured to one side only of the stove, it is evident that one may be attached to each of the other sides, if so desired. Instead of having this attachment detachably secured to the stove, as here shown, the top plate of the stove may be so formed as to extend or project outward upon one or more sides, and thus form the top plate of my attachment. In that case the bottom plate that forms the chamber part of the attachment would be connected to the under side in any suitable manner.

Where the attachment is made separate and distinct from the stove, if so desired, a brace or support, $n$, may be secured to the under side for the purpose of preventing the weight of the articles upon the top of the attachment from causing it to sag downward.

By means of my invention, as described above, I am enabled to at least double the efficiency of any of the oil-stoves now in use, and provide a means by which plates, dishes, and all articles already cooked may be kept warm while others are being prepared.

By the application of my attachment to cylinder-stoves the heat from the lamp is concentrated and intensified under the articles being cooked or heated at least one-third, as my attachment prevents the heated air from passing away too rapidly through the flues, as it always otherwise does.

Having thus described my invention, what I claim, and desire to secure by Letters Patent, is—

1. In combination with an oil or gas cooking-stove, the hollow heater $r$ applied to the top edge of the stove, the stove having the flues $i$, so that the surplus heat can pass into the heater, and the heater having the flues $d$ at or near the outer edge or side, so that when the heat has passed through the heater it can escape directly into the air, substantially as shown.

2. In combination with an oil or gas cooking-stove, a hollow detachable heating or warming table or platform, the stove and heater being provided with flues $i$ $d$, so that the surplus heat of the lamp will pass through the heater into the air, substantially as described.

3. The combination of an oil or gas cooking-stove with a heating platform or table, there being left a slight space between the under plate of the heater and the side of the stove, so that a current of cold air will pass up the sides of the stove and prevent it from overheating, substantially as set forth.

In testimony that I claim the foregoing I have hereunto set my hand this 15th day of June, 1877.

O. F. STEDMAN.

Witnesses:
MYRON GIBBS,
O. H. GIBBS.